(12) United States Patent
Woo et al.

(10) Patent No.: US 11,866,584 B2
(45) Date of Patent: Jan. 9, 2024

(54) HIGH-REFRACTIVE-INDEX COMPOSITION, HIGH-REFRACTIVE-INDEX FILM, AND METHOD FOR MANUFACTURING HIGH-REFRACTIVE-INDEX FILM

(71) Applicant: LG CHEM, LTD., Seoul (KR)

(72) Inventors: Seung A Woo, Daejeon (KR); Dong Woo Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 647 days.

(21) Appl. No.: 17/041,181

(22) PCT Filed: Sep. 20, 2019

(86) PCT No.: PCT/KR2019/012194
§ 371 (c)(1),
(2) Date: Sep. 24, 2020

(87) PCT Pub. No.: WO2020/060257
PCT Pub. Date: Mar. 26, 2020

(65) Prior Publication Data
US 2021/0095128 A1    Apr. 1, 2021

(30) Foreign Application Priority Data

Sep. 20, 2018  (KR) .................. 10-2018-0112998
Sep. 20, 2018  (KR) .................. 10-2018-0113001

(51) Int. Cl.
| | |
|---|---|
| C09D 5/00 | (2006.01) |
| C09D 1/00 | (2006.01) |
| C01G 17/00 | (2006.01) |
| C08L 85/00 | (2006.01) |
| C08J 5/18 | (2006.01) |
| G02B 1/04 | (2006.01) |
| G02B 1/118 | (2015.01) |
| C08F 110/02 | (2006.01) |
| C08G 59/30 | (2006.01) |
| C08G 59/32 | (2006.01) |

(52) U.S. Cl.
CPC ............ *C08L 85/00* (2013.01); *C08F 110/02* (2013.01); *C08G 59/30* (2013.01); *C08G 59/3254* (2013.01); *C08J 5/18* (2013.01); *G02B 1/04* (2013.01); *G02B 1/118* (2013.01)

(58) Field of Classification Search
None
See application file for complete search history.

(56) References Cited

U.S. PATENT DOCUMENTS

| | | | |
|---|---|---|---|
| 6,248,852 B1 | 6/2001 | Risen, Jr. et al. | |
| 2005/0054802 A1 | 3/2005 | Lai et al. | |
| 2009/0156775 A1 | 6/2009 | Sakamoto et al. | |
| 2010/0136769 A1* | 6/2010 | Keshavarz | C08J 3/12 |
| | | | 977/840 |
| 2011/0281090 A1 | 11/2011 | Watanabe et al. | |
| 2015/0184022 A1 | 7/2015 | Srivastava et al. | |

FOREIGN PATENT DOCUMENTS

| | | |
|---|---|---|
| CN | 1846152 A | 10/2006 |
| CN | 101336263 A | 12/2008 |
| CN | 104262969 A | 1/2015 |
| JP | S59-16829 A | 1/1984 |
| JP | H05-163354 A | 6/1993 |
| JP | H07-316304 A | 12/1995 |
| JP | 2007-254593 A | 10/2007 |
| JP | 2009-057442 A | 3/2009 |
| JP | 2009-145872 A | 7/2009 |
| JP | 2012-063577 A | 3/2012 |
| JP | 5762392 B2 | 8/2015 |
| KR | 10-2011-0095304 A | 8/2011 |
| KR | 10-2015-0010760 A | 1/2015 |
| KR | 10-2016-0030432 A | 3/2016 |
| KR | 10-2017-0064860 A | 6/2017 |
| TW | 201024221 A | 7/2010 |
| TW | 201211115 A | 3/2012 |
| WO | 2010-055859 A | 5/2010 |
| WO | 2011-102380 A | 8/2011 |

OTHER PUBLICATIONS

Seyferth D. et al. "The Preparation of Vinylgermanium Compounds by the Grignard Method", J. Am. Chem. Soc., 1957, 79, 11, 2738-2740.
International Search Report issued for International Application No. PCT/KR2019/012194 dated Dec. 27, 2019, 2 pages.
Watanabe, et al., "Field-effect transistor based on organosoluble germanium nanoclusters", Appl. Organom et al. Chem. 2005; 19: 530-537.

* cited by examiner

*Primary Examiner* — Michael J Feely
(74) *Attorney, Agent, or Firm* — ROTHWELL, FIGG, ERNST & MANBECK, P.C.

(57) ABSTRACT

The present application relates to a high refractive-index composition, a high refractive-index film and a method for producing a high refractive-index film. The present application provides a composition that a high refractive-index film can be produced with a simple coating process and low cost, and a high refractive-index film having a uniform thickness and easy thickness control or molding, as well as having high chemical stability and easy control of physical properties such as transparency or heat resistance, can be produced, a high refractive-index film using the same and a method for producing a high refractive-index film.

14 Claims, No Drawings

HIGH-REFRACTIVE-INDEX COMPOSITION, HIGH-REFRACTIVE-INDEX FILM, AND METHOD FOR MANUFACTURING HIGH-REFRACTIVE-INDEX FILM

The present application is a 35 U.S.C. 371 National Phase Entry Application from PCT/KR2019/012194, filed on Sep. 20, 2019, designating the United States, which claims the benefit of priority based on Korean Patent Application No. 10-2018-0113001 filed on Sep. 20, 2018 and Korean Patent Application No. 10-2018-0112998 filed on Sep. 20, 2018, the disclosures of which are incorporated herein by reference in their entirety.

TECHNICAL FIELD

The present application relates to a high refractive-index composition, a high refractive-index film and a method for producing a high refractive-index film.

BACKGROUND ART

High refractive-index polymers can be used in optical products, for example, optical lenses, optical media, and the like, and high refractive-index films can be used, for example, to improve internal light extraction of organic light emitting elements.

Conventionally, most of the polymers developed to obtain high refractive-index properties include halogen elements, so that there are problems that they are toxic and generate a large amount of corrosive gas when burned. Also, the refractive index limit of polymers or polymer films made of carbon is 1.7 or less, so that a material having a higher refractive index is required. On the other hand, in order to increase the refractive index of the organic material, the process of putting the metal oxide particles inside the polymer matrix can be performed, but in order to form a uniform film, there is a limit in increasing the refractive index because the content of the oxide particles is limited. Furthermore, the inorganic particles have a higher refractive index as compared to the organic material, but when the thin film is formed using the inorganic particles, there may be problems that it is difficult to control the thickness of the thin film and the molding is not ease. On the other hand, researches on producing high refractive-index films using silicon (Si) or germanium (Ge) semiconductors have been performed, but in the case of forming the films through CVD (chemical vapor deposition), plasma enhanced CVD or sputtering, there are limitations in terms of slow process speed and cost depending on the vaporization reaction. In addition, a Ge-ligand or poly(Ge—O—Ge), and the like is known as a method of using a Ge-containing organic compound in the field of organic optics, but this also has a limit of obtaining a refractive index of 1.8 or less (Patent Document 1: Korean Laid-Open Patent Publication No. 2016-0030432).

BRIEF DESCRIPTION OF INVENTION

The present application provides a high refractive-index composition, a high refractive-index film and a method for producing a high refractive-index film. Specifically, the present application provides a composition that a high refractive-index film can be produced with a simple coating process and low cost, and a high refractive-index film having a uniform thickness and easy thickness control or molding, as well as having high chemical stability and easy control of physical properties such as transparency or heat resistance, can be produced, a high refractive-index film using the same and a method for producing a high refractive-index film.

The present application relates to a high refractive-index composition. The high refractive-index composition may comprise a polymer containing germanium (Ge) elements. The high refractive-index composition may comprise a polymer including a polymerized unit containing a germanium (Ge) element as a main chain and at least two or more reactive groups as a side chain. The reactive group may be a photoreactive group or a thermally reactive group. Through such a high refractive-index composition, a high refractive-index film can be produced with a simple coating process and low cost, and a high refractive-index film having a uniform thickness and easy thickness control or molding, as well as having high chemical stability and easy control of physical properties such as transparency or heat resistance can be produced.

DETAILED DESCRIPTION OF INVENTION

In this specification, the term "main chain" may mean a chain forming a backbone of a polymer. The main chain may mean a backbone that a polymerized unit of the polymer is repeated. In this specification, the "side chain" may mean a chain which branches from the backbone of the polymer main chain. The side chain may be called a residue or an end group. In this specification, the "polymerized unit" may mean a unit structure that is polymerized and repeated in a polymer. In this specification, the "reactive group" may mean a functional group that a chemical reaction is induced by external energy. In this specification, the "photoreactive group" may mean a functional group that a chemical reaction is induced by light irradiation. In this specification, the "thermally reactive group" may mean a functional group that a chemical reaction is induced by heat application. The photoreactive group may mean that it includes a photopolymerizable group, a photocurable group or a photocrosslinkable group, and the like. The thermally reactive group may mean that it includes a thermally polymerizable group, a thermally curable group or a thermally crosslinkable group, and the like.

The main chain of the polymer may comprise the germanium (Ge) elements in the form of Ge—Ge bonds. The Ge—Ge bond may be included as the polymerized unit of the main chain of the polymer. The polymer may exhibit a high refractive index by comprising germanium (Ge) in the form of Ge—Ge bonds.

In one example, the polymer may be a compound represented by the following formula 1.

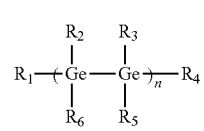

[Formula 1]

In Formula 1, $R_1$ to $R_6$ may each independently be a hydrogen atom, an alkyl group, an aryl group, a photoreactive group or a thermally reactive group, at least two of $R_1$ to $R_6$ may be a reactive group, for example, a photoreactive group or a thermally reactive group, and n may be an integer of 5 to 1000. The n may specifically be an integer of 5 to 500, an integer of 5 to 250 or an integer of 5 to 100.

The alkyl group or aryl group may be classified into a non-reactive group, unlike the photoreactive group or thermally reactive group. When an alkyl group or an aryl group is introduced into a side chain other than the photoreactive group or the thermally reactive group of the polymer, it may exhibit excellent coating properties and may exhibit excellent dispersibility in other materials such as an organic matrix.

As the alkyl group, an alkyl group having 1 to 20 carbon atoms, specifically 1 to 10 carbon atoms, and more specifically 1 to 7 carbon atoms may be used. As the aryl group, an aryl group having 6 to 40 carbon atoms, specifically 6 to 30 carbon atoms, and more specifically 6 to 20 carbon atoms may be used.

The photoreactive group may be a functional group in which a chemical reaction is induced by light irradiation, for example, ultraviolet irradiation. As a specific example, the photoreactive group may be a vinyl group, a (meth)acryl group, a (meth)acryloyloxy group, a (meth)acrylamide group, a vinyloxy group or a maleimide group, and the like. The polymer having a photoreactive group may increase chemical stability of a high refractive-index film because a curing reaction may occur by light irradiation.

The thermally reactive group may be a functional group in which a chemical reaction is induced by heat application. As a specific example, the thermally reactive group may be an epoxy group, an oxetane group, an alkenyl group, a hydrogen atom bonded to a silicon atom, an isocyanate group, a hydroxy group, a phthalonitrile group or a carboxyl group, and the like. The polymer having a thermally reactive group may increase chemical stability of a high refractive-index film because a curing reaction may occur by heat application.

The method of preparing a polymer of Formula 1 above is not particularly limited.

As one example, when the reactive group is a photoreactive group, it may be prepared, for example, by a step (S1) of reacting germanium tetrachloride in the presence of magnesium in an organic solvent and a step (S2) of adding a halide of alkyl, aryl, vinyl or (meth)acryl to the reactant in the step (S1) to react them. In one example, the halide may be a bromide.

In one example, the step S2 may be performed two or more times. In one example, when all of the side chains $R_1$ to $R_6$ of the polymer are photoreactive groups, the desired polymer can be obtained by adding a halide of vinyl or (meth)acryl thereto and then reacting them (S2-1), and further adding a halide of vinyl or (meth)acryl thereto to react them (S2-2). In another example, when some side chains of the polymer are photoreactive groups and the others are non-reactive groups, the desired polymer can be obtained by adding a halide of vinyl or (meth)acryl thereto and then reacting them (S2-1), and further adding a halide of alkyl or aryl thereto to react them (S2-2). The number of moles of the halide added in each step of (S2-1) and (S2-2) can be controlled to be the same as the number of moles of germanium tetrachloride in the step (S1).

The reaction conditions of (S1), (S2), (S2-1) and (S2-2) above may be appropriately adjusted to obtain the desired reactant. The (S1) reaction may be performed, for example, under an argon atmosphere. In addition, the (S1) reaction may be performed, for example, for about 60 minutes to 120 minutes, specifically 80 minutes to 90 minutes. The (S2-1) reaction may be performed, for example, at a temperature of about 5° C. to 30° C., specifically about 5° C. to 15° C. for about 30 minutes to 90 minutes, specifically about 50 minutes to 70 minutes. The (S2-2) reaction may be performed, for example, at a temperature of about 30° C. to 70° C., specifically about 40° C. to 60° C. for about 100 minutes to 150 minutes, specifically about 110 minutes to 130 minutes.

When the reactive group is a thermally reactive group, it may be prepared, for example, by a step (S1) of reacting germanium chloride (germanium tetrachloride) in an organic solvent in the presence of magnesium and a step (S2) of adding a halide of alkyl, aryl or epoxy to the reactant in the step (S1) and reacting them. In one example, the halide may be a bromide.

In one example, the step S2 may be performed two or more times. In one example, when the side chains $R_1$ to $R_6$ of the polymer are all thermally reactive groups, the desired polymer can be obtained by adding a halide of epoxy thereto and then reacting them (S2-1), and further adding a halide of epoxy thereto to react them (S2-2). In another example, when some side chains of the polymer are thermally reactive groups and the others are non-reactive groups, the desired polymer can be obtained by adding a halide of epoxy thereto and then reacting them (S2-1), and further adding a halide of alkyl or aryl thereto to react them (S2-2). The number of moles of the halide added in each step of (S2-1) and (S2-2) can be controlled to be the same as the number of moles of germanium tetrachloride in the step (S1).

The reaction conditions of (S1), (S2), (S2-1) and (S2-2) above may be appropriately adjusted to obtain the desired reactant. The (S1) reaction may be performed, for example, under an argon atmosphere. In addition, the (S1) reaction may be performed, for example, for about 60 minutes to 120 minutes, specifically 80 minutes to 90 minutes. The (S2-1) reaction may be performed, for example, at a temperature of about 5° C. to 30° C., specifically about 5° C. to 15° C. for about 30 minutes to 90 minutes, specifically about 50 minutes to 70 minutes. The (S2-2) reaction may be performed, for example, at a temperature of about 30° C. to 70° C., specifically about 40° C. to 60° C. for about 100 minutes to 150 minutes, specifically about 110 minutes to 130 minutes.

The composition may further comprise a solvent. The solvent may be an organic solvent. As the organic solvent, a solvent of hydrocarbon series, halogenated hydrocarbon series or ether series may be used. An example of the hydrocarbon series may include pentane, hexane, heptane, cyclohexane, n-decane, n-dodecane, benzene, toluene, xylene, methoxy benzene and the like. An example of the halogenated hydrocarbon series may include carbon tetrachloride, chloroform, 1,2-dichloroethane, dichloromethane, chlorobenzene and the like. An example of the ether series may include tetrahydrofuran, dioxane, propylene glycol mono methyl ether acetate, and the like.

The composition may comprise a polymer in an amount of 5 to 100 parts by weight relative to 100 parts by weight of the solvent. When the concentration of the polymer is too low, it is difficult to form a film because the coating is not, and when it is too high, the coating property of the film may be lowered, so that it may be preferable to be adjusted within the above range.

The composition may further comprise a curable monomer. The curable monomer may be a photocurable monomer or a thermosetting monomer. When the polymer has a photoreactive group as the reactive group, it may comprise a photocurable monomer, and when the polymer has a thermally reactive group, it may comprise a thermosetting monomer.

The photocurable monomer may mean a compound containing at least one or more photocurable groups. The photocurable group may be exemplified by a vinyl group or a (meth)acryl group. The photocurable monomer is similar to the polymer having the photoreactive group in that it has a photocurable group, but it may be different from the polymer in that it does not have a polymerized unit containing a germanium (Ge) element. The photocurable monomer may be a single molecule or a polymer. When the photocurable monomer is further included in the composition, it may be preferable that the polymer has at least one or more alkyl groups or aryl groups as side chains. Through this, it is possible to obtain a composition in which the polymer and the photocurable monomer are mixed homogeneously.

The thermosetting monomer may mean a compound containing at least one or more thermosetting groups. The thermosetting group may be exemplified by an epoxy group. The thermosetting monomer is similar to the polymer having the thermally reactive group in that it has a thermosetting group, but it may be different from the polymer in that it does not have a polymerized unit containing a germanium (Ge) element. The thermosetting monomer may be a single molecule or a polymer. When the thermosetting monomer is included in the composition, it may be preferable that the polymer has at least one or more alkyl groups or aryl groups as side chains. Through this, it is possible to obtain a composition in which the polymer and the thermosetting monomer are mixed homogeneously.

In one example, the photocurable monomer may be a multifunctional compound containing two or more photocurable groups. This is advantageous in terms of reaction rate. The upper limit of the photocurable groups in the photocurable monomer may be, for example, 10 or less, 8 or less, 6 or less, 4 or less, or 3 or less.

According to the kind of the photocurable monomer, it is possible to easily adjust physical properties such as transparency and heat resistance of the high refractive-index composition or the high refractive-index film. The photocurable monomer is preferably a compound having two or more (meth)acryl groups in its molecule, which may include, for example, 1,6-hexanediol di(meth)acrylate, triethylene glycol di(meth)acrylate, ethylene oxide modified bisphenol A di(meth)acrylate, trimethylolpropane tri(meth)acrylate, pentaerythritol tetra(meth)acrylate, ditrimethylolpropane tetra(meth)acrylate, dipentaerythritol hexa(meth)acrylate, pentaerythritol tri(meth)acrylate, 3-(meth)acryloyloxy glycerin mono(meth)acrylate, urethane acrylate, epoxy acrylate, ester acrylate, and the like, but is not necessarily limited thereto. In addition, a vinyl group-substituted aromatic ring compound and the like can be exemplified, and as a specific example, divinylbenzene, diallyl ether, diallyl sulfide, adipic acid diallyl ester, adipic acid divinyl ester, and the like can be used, without being necessarily limited thereto.

The content of the photocurable monomer may be appropriately adjusted in consideration of the desired physical properties. The photocurable monomer may be included, for example, in an amount of 10 to 50 parts by weight or 20 to 30 parts by weight relative to 100 parts by weight of the polymer. When the content of the photocurable monomer is too low, the effect on physical properties such as transparency or heat resistance may be insignificant, and when it is too high, the refractive index may be lowered by decreasing the Ge content, so that it may be preferable that it is adjusted in the above range.

In one example, the thermosetting monomer may be a multifunctional compound containing two or more thermosetting groups. This is advantageous in terms of reaction rate. The upper limit of the thermosetting groups in the thermosetting monomer may be, for example, 10 or less, 8 or less, 6 or less, 4 or less, or 3 or less.

According to the kind of the thermosetting monomer, it is possible to easily adjust physical properties such as transparency and heat resistance of the high refractive-index composition or the high refractive-index film. The thermosetting monomer may also include (a) di- and polyphenols, (b) di- and polycarboxylic acids, (c) di- and polymercaptans, (d) di- and polyamines, (e) primary monoamine, (f) sulfonamide, (g) aminophenol, (h) aminocarboxylic acid, (i) phenolic hydroxyl-containing carboxylic acid, (j) sulfanylamide, (k) alkyleneamine, and (l) any combination of two or more of these compounds, and the like.

An example of di- and polyphenols (a) includes 1,2-dihydroxybenzene (catechol); 1,3-dihydroxybenzene (resorcinol); 1,4-dihydroxybenzene (hydroquinone); 4,4'-isopropylidenediphenol (bisphenol A); 4,4'-dihydroxydiphenylmethane; 3,3',5,5'-tetrabromobisphenol A; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1'-bis(4-hydroxyphenyl)-1-phenylethane; 3,3',5,5'-tetrachlorobisphenol A; 3,3'-dimethoxybispenol A; 3,3',5,5'-tetramethyl-4,4'-dihydroxydiphenyl; 4,4'-dihydroxybiphenyl; 4,4'-dihydroxy-alpha-methylstilbene; 4,4'-dihydroxybenzanilide; 4,4'-dihydristylbene; 4,4'-dihydroxy-alpha-cyanostilbene; 1,1-bis(4-hydroxyphenyl)cyclohexane; 1,4-dihydroxy-3,6-dimethylbenzene; 1,4-dihydroxy-3,6-dimethoxybenzene; 1,4-dihydroxy-2-tert-butylbenzene; 1,4-dihydroxy-2-bromo-5-methylbenzene; 1,3-dihydroxy-4-nitrophenol; 1,3-dihydroxy-4-cyanophenol; tris(hydroxyphenyl)methane; dicyclopentadiene or an oligomer thereof and a phenol or substituted phenol condensation product and a mixture thereof.

An example of di- and polycarboxylic acids (b) also includes terephthalic acid; isophthalic acid; dicyclopentadienedicarboxylic acid; tris(carboxyphenyl)methane; 4,4'-dicarboxydiphenylmethane; ,4-cyclohexanedicarboxylic acid; 1,6-hexanedicarboxylic acid; 1,4-butanedicarboxylic acid; 1,1-bis(4-carboxyphenyl)cyclohexane; 3,3',5,5'-tetramethyl-4,4'-dicarboxyphenyl; 4,4'-dicarboxy-alpha-methylstilbene; 1,4-bis(4-carboxyphenyl)-trans-cyclohexane; 1,1'-bis(4-carboxyphenyl)cyclohexane; 1,3-dicarboxy-4-methylbenzene; 1,3-dicarboxy-4-methoxybenzene; 1,3-dicarboxy-4-bromobenzene; and any combination thereof.

An example of di- and polymercaptans (c) also includes bis(2-mercaptoethyl)sulfide; tris(mercaptophenyl)methane; 1,3-benzenedithiol; 1,4-benzenedithiol; 4,4'-dimercaptodiphenylmethane; 4,4'-dimercaptodiphenyl oxide; 4,4'-dimercapto-alpha-methylstilbene; 3,3',5,5'-tetramethyl-4,4'-dimercaptodiphenyl; 1,4-cyclohexanedithiol; 1,6-hexanedithiol; 2,2'-dimercaptodiethyl ether; 1,2-dimercaptopropane; 1,1-bis(4-mercaptophenyl)cyclohexane and any combination thereof.

An example of di- and polyamines (d) also includes tris(aminophenyl)methane; bis(aminomethyl)norbornane; piperazine; ethylenediamine; diethylenetriamine; tri ethylenetetramine; tetraethylenepentamine; 1-(2-aminoethyl)piperazine; bis(aminopropyl)ether; bis(aminopropyl)sulfide; isophorone diamine; 1,2-diaminobenzene; 1,3-diaminobenzene; 1,4-diaminobenzene; 4,4'-diaminodiphenylmethane; 4,4'-diaminodiphenylsulfone; 2,2'-diaminodiphenylsulfone; 4,4'-diaminodiphenyl oxide; 3,3',5,5'-tetramethyl-4,4'-diaminodiphenyl; 3,3'-dimethyl-4,4'-diaminodiphenyl; 4,4'-diamino-alpha-methylstilbene; 4,4'-diaminobenzanilide; 4,4'-diaminostilbene; 1,4-bis(4-aminophenyl)-trans-cyclohexane; 1,1-bis(4-aminophenyl)cyclohexane; 1,2-cyclohexanediamine; 1,4-bis(aminocyclohexyl)methane; 1,3-bis(aminomethyl)cyclohexane; 1,4-bis(aminomethyl)cyclohexane; 1,4-cyclohexanediamine; 1,6-hexanediamine; 1,3-xylenediamine; 2,2'-bis(4-aminocyclohexyl)propane; 4-(2-aminopropan-2-yl)-1-methylcyclohexane-1-amine (methane diamine); and any combination thereof.

An examples of primary monoamine (e) also includes aniline; 4-chloroaniline; 4-methylaniline; 4-methoxyaniline; 4-cyanoaniline; 4-aminodiphenyl oxide; 4-aminodiphenylmethane; -aminodiphenyl sulfide; 4-aminobenzophenone; 4-aminodiphenyl; 4-aminostilbene; 4-amino-alpha-methylstilbene; methylamine; 4-amino-4'-nitrostilbene; n-hexylamine; cyclohexylamine; aminonorbomane; N,N-diethyltrimethylenediamine; 2,6-dimethylaniline; and any combination thereof.

An example of sulfonamide (f) also includes phenylsulfonamides; 4-methoxyphenylsulfonamide; 4-chlorophenylsulfonamide; 4-bromophenylsulfonamide; 4-methylsulfonamide; 4-cyanosulfonamide; 4-sulfonamidodiphenyl oxide; 4-sulfonamidodiphenylmethane; 4-sulfonamidobenzophenone; 4-sulfonylamidodiphenyl; 4-sulfonamidostilbene; 4-sulfonamido-alpha-methylstilbene; 2,6-dimethylphenylsulfon amide; and any combination thereof.

An example of aminophenol (g) also includes o-aminophenols; m-aminophenol; p-aminophenol; 2-methoxy-4-hydroxyaniline; 3-cyclohexyl-4-hydroxyaniline; 2,6-dibromo-4-hydroxyaniline; 5-butyl-4-hydroxyaniline; 3-phenyl-4-hydroxyaniline; 4-(1-(3-aminophenyl)-1-methylethyl)phenol; 4-(1-(4-aminophenyl)ethyl)phenol; 4-(4-aminophenoxy)phenol; 4-((4-aminophenyl)thio)phenol; (4-aminophenyl)(4-hydroxyphenyl)methanone; 4-((4-aminophenyl)sulfonyl)phenol; N-methyl-p-aminophenol; 4-amino-4'-hydroxy-alpha-methylstilbene; 4-hydroxy-4'-amino-alpha-methylstilbene; 3,5-dimethyl-4-hydroxyaniline; 4-(1-(4-amino-3,5-dibromophenyl)-1-methylethyl)-2,6-dibromophenol; and any combination thereof.

An example of aminocarboxylic acid (h) also includes 2-aminobenzoic acid; 3-aminobenzoic acid; 4-aminobenzoic acid; 2-methoxy-4-aminobenzoic acid; 3-cyclohexyl-4-aminobenzoic acid; 5-butyl-4-aminobenzoic acid; 3-phenyl-4-aminobenzoic acid; 4-(1-(3-aminophenyl)-1-methylethyl)benzoic acid; 4-(1-(4-aminophenyl)ethyl)benzoic acid; 4-(4-aminophenoxy)benzoic acid; 4-((4-aminophenyl)thio)benzoic acid; (4-aminophenyl)(4-carboxyphenyl)methanone; 4-((4-aminophenyl)sulfonyl)benzoic acid; N-methyl-4-aminobenzoic acid; 4-amino-4'-carboxy-alpha-methylstilbene; 4-carboxy-4'-amino-alpha-methylstilbene; glycine; N-methylglycine; 4-aminocyclohexanecarboxylic acid; 4-aminohexanoic acid; 4-piperidinecarboxylic acid; 5-aminophthalic acid; 3,5-dimethyl-4-aminobenzoic acid; 2,6-dibromo-4-aminobenzoic acid; 4-(1-(4-amino-3,5-dibromophenyl)-1-methylethyl)-2,6-dibromobenzoic acid; and any combination thereof.

An example of carboxylic acid (i) also includes 2-hydroxybenzoic acid; 3-hydroxybenzoic acid; 4-hydroxybenzoic acid; 2-methoxy-4-hydroxybenzoic acid; 3-cyclohexyl-4-hydroxybenzoic acid; 5-butyl-4-hydroxybenzoic acid; 3-phenyl-4-hydroxybenzoic acid; 4-(1-(3-hydroxyphenyl)-1-methylethyl)benzoic acid; 4-(1-(4-hydroxyphenyl)ethyl)benzoic acid; 4-(4-hydroxyphenoxy)benzoic acid; 4-((4-hydroxyphenyl)thio)benzoic acid; (4-hydroxyphenyl)(4-carboxyphenyl)methanone; 4-((4-hydroxyphenyl)sulfonyl)benzoic acid; 4-hydroxy-4'-carboxy-a-methylstilbene; 4-carboxy-4'-hydroxy-a-methylstilbene; 2-hydroxyphenylacetic acid; 3-hydroxyphenylacetic acid; 4-hydroxyphenylacetic acid; 4-hydroxyphenyl-2-cyclohexanecarboxylic acid; 4-hydroxyphenoxy-2-propanoic acid; 4-(1-(4-hydroxy-3,5-dibromophenyl)-1-methylethyl)-2,6-dibromobenzoic acid; 3,5-dimethyl-4-hydroxybenzoic acid; 2,6-dibromo-4-hydroxybenzoic acid; and any combination thereof.

An example of sulfanylamide (j) also includes o-sulfanylamide; m-sulfanylamide; p-sulfanylamide; 2-methoxy-4-aminobenzoic acid; 3-methyl-4-sulfonamido-1-aminobenzene; 5-methyl-sulfonamido-1-aminobenzene; 3-phenyl-4-sulfonamido-1-aminobenzene; 4-(1-(3-sulfonamidophenyl)-1-methylethyl)aniline; 4-(1-(4-sulfonamidophenyl)ethyl)aniline; 4-(4-sulfonamidophenoxy)aniline; 4-((4-sulfonamidophenyl)thio)aniline; (4-sulfonamidophenyl)(4-aminophenyl)methanone; 4-((4-sulfonamidophenyl)sulfonyl)aniline; 4-sulfonamido-1-N-methylaminobenzene; 4-amino-4'-sulfonamido-α-methylstilbene; 4-sulfonamido-'-amino-α-methylstilbene; 4-(1-(4-sulfonamido-3,5-dibromophenyl)-1-methylethyl)-2,6-dibromoaniline; 2,6-dimethyl-4-sulfonamido-1-aminobenzene; and any combination thereof.

The content of the thermosetting monomer may be appropriately adjusted in consideration of the desired physical properties. The thermosetting monomer may be included, for example, in an amount of 10 to 50 parts by weight relative to 100 parts by weight of the polymer. When the content of the thermosetting monomer is too low, the effect on physical properties such as transparency or heat resistance may be insignificant, and when it is too high, the refractive index may be lowered by decreasing the Ge content, so that it may be preferable that it is adjusted in the above range.

The high refractive-index composition may further comprise a polymerization initiator. When the polymer has photoreactive groups, the high refractive-index composition may further comprise a photopolymerization initiator. When the polymer has thermally reactive groups, the high refractive-index composition may further comprise a thermal polymerization initiator.

The photopolymerization initiator may be, for example, a radical initiator. As the photopolymerization initiator, general initiators, such as a benzoin-based initiator, a hydroxyketone-based initiator, an aminoketone-based initiator or a phosphine oxide-based initiator, which can initiate photopolymerization by generating radicals by irradiation of light such as ultraviolet rays, can be used without limitation.

As the thermal polymerization initiator, a curing agent can be used. In one example, when the thermally reactive group is an epoxy group, the curing agent is a curing agent of an epoxy resin known in the art, and for example, one or two or more of an amine curing agent, an imidazole curing agent, a phenol curing agent, a phosphorus curing agent or an acid anhydride curing agent, and the like can be used, without being limited thereto. In one example, as the curing agent, an imidazole compound, which is solid at room temperature and has a melting point or decomposition temperature of 80° C. or higher, can be used. Such a compound can be exemplified by, for example, 2-methyl imidazole, 2-heptadecyl imidazole, 2-phenyl imidazole, 2-phenyl-4-methyl imidazole or 1-cyanoethyl-2-phenyl imidazole, and the like, but is not limited thereto.

The high refractive-index composition may further comprise optional additives in addition to the aforementioned components. Such an additive may be exemplified by, for example, a curing agent to assist curing, an initiator, a thixotropic agent, a leveling agent, an antifoaming agent, an antioxidant, a radical generating material, organic and inorganic pigments or dyes, a dispersant, various fillers such as a thermally conductive filler or an insulating filler, a functional polymer or a light stabilizer, and the like, but is not limited thereto.

The present application also relates to a high refractive-index film. The high refractive-index film of the present application may comprise the high refractive-index composition. The high refractive-index film of the present application may comprise a high refractive-index composition, which includes a polymer containing a polymerized unit containing germanium (Ge) elements as a main chain and at least two or more reactive groups, for example, photoreactive groups or thermally reactive groups as side chains, in a cured state. Here, the above-described contents can be equally applied to matters related to the high refractive-index composition.

When the polymer has photoreactive groups, at least two or more photoreactive groups of the polymer in the high refractive-index film may be present in a bonded state by reacting with each other. When the polymer has thermally reactive groups, at least two or more thermally reactive groups of the polymer in the high refractive-index film may be present in a bonded state by reacting with each other. Through this, it is possible to secure chemical stability of the high refractive-index film.

The high refractive-index film may exhibit a high refractive index. For example, the high refractive-index film may have a refractive index of 1.8 or more for a wavelength of 632 nm. The upper limit of the refractive index in the high refractive-index film is not particularly limited, but the upper limit of the refractive index that can be produced through the high refractive-index composition of the present application may be, for example, 4 or less. The thickness of the high refractive-index film can be appropriately adjusted in consideration of the desired refractive index and the use of the film. The thickness of the high refractive-index film can be, for example, 100 nm to 1000 µm. The high refractive-index film of the present application may exhibit a high refractive index even at such a thin thickness.

The present application also relates to a method for producing a high refractive-index film. In the method for producing a high refractive-index film of the present application, the high refractive-index composition may be used. The method for producing a high refractive-index film of the present application may comprise steps of coating a high refractive-index composition, which includes a polymer containing a polymerized unit containing germanium (Ge) elements as a main chain and at least two or more reactive groups, for example, photoreactive groups or thermally reactive groups as side chains, on a substrate and irradiating the coated composition with light or applying heat thereto. Here, the above-described contents can be equally applied to matters related to the high refractive-index composition.

According to the production method, a high refractive-index film can be produced with a simple coating process and low cost, and a high refractive-index film having a uniform thickness and easy thickness control or molding, as well as having high chemical stability and easy control of physical properties such as transparency or heat resistance can be produced.

The method of coating a composition on a substrate is not particularly limited, which can be performed by coating through a known coating method such as, for example, spin coating, roll coating, a printing method, inkjet coating, a slit nozzle method, bar coating, comma coating or gravure coating.

The substrate is not particularly limited and a quartz substrate, a glass substrate, a silicon substrate, a plastic substrate, or the like may be appropriately selected and used.

When the polymer has photoreactive groups, the step of irradiating the coated composition with light may be performed. The irradiation of the composition with light may be performed by irradiating it with ultraviolet rays. The ultraviolet rays may be irradiated at an intensity of 500 mJ/cm$^2$ to 5000 mJ/cm$^2$, 1000 mJ/cm$^2$ to 3000 mJ/cm$^2$ or 1500 mJ/cm$^2$ to 2500 mJ/cm$^2$. When the intensity of the ultraviolet rays is too weak, a sufficient curing reaction may not occur, and when it is too strong, the physical properties of the film may be affected, so that it may be preferable to be adjusted within the above range.

The ultraviolet rays may be irradiated at room temperature. In this specification, the "room temperature" is a natural temperature without warming or cooling, which may mean any temperature within a range of about 15° C. to 40° C., for example, a temperature of about 20° C., about 25° C. or about 30° C. or so. In this specification, unless otherwise specified, the temperature may mean a room temperature condition.

The composition can be cured by light irradiation. At this time, at least two or more photoreactive groups of the polymer may react with each other to be in a bonded state. Through this, it is possible to secure the chemical stability of the high refractive-index film.

When the polymer has thermally reactive groups, the step of applying heat to the coated composition may be performed. The application of heat to the composition may be performed in a temperature range of 30° C. to 260° C., 100° C. to 220° C. or 150° C. to 200° C. When the heat is too weak, a sufficient curing reaction may not occur, and when the heat is too strong, the physical properties of the film may be affected, so that it may be preferable to be adjusted within the above range. The application of heat to the composition may be performed for 10 minutes to 24 hours, 10 minutes to 12 hours or 10 minutes to 1 hour. When the curing time is short, the reaction is not so sufficient that the degree of curing of the film may be low, and when the curing time is long, the film productivity may be lowered due to a longer process time, so that it may be preferable that the time is adjusted within the above range.

The composition can be cured by heat application. At this time, at least two or more thermally reactive groups of the polymer may react with each other to be in a bonded state. Through this, it is possible to secure the chemical stability of the high refractive-index film.

The high refractive-index composition, the high refractive-index film, and the method for producing a high refractive-index film of the present application can be applied to various technical fields requiring high refractive-index materials. The high refractive-index polymer can be used in various optical products, for example, optical lenses, optical media, and the like, and the high refractive-index film can be used, for example, to improve internal light extraction of organic light emitting elements, without being limited thereto.

ADVANTAGEOUS EFFECTS

The present application provides a composition that a high refractive-index film can be produced with a simple coating process and low cost, and a high refractive-index film having a uniform thickness and easy thickness control or molding, as well as having high chemical stability and easy control of physical properties such as transparency or heat resistance, can be produced, a high refractive-index film using the same and a method for producing a high refractive-index film.

Hereinafter, the present application will be described in detail through examples according to the present application and comparative examples not complying with the present application, but the scope of the present application is not limited to the following examples.

EXAMPLE 1

Preparation of High Refractive-Index Composition 16 mmol of germanium tetrachloride (manufactured by sigma-aldrich) and 128 mmol of magnesium (Mg) metal (manufactured by sigma-aldrich) were added to 40 ml of THF (tetrahydrofuran), and then reacted under argon (Ar) for 90 minutes. Next, 16 mmol of vinyl bromide (manufactured by sigma-aldrich) was slowly added in drops at 10° C. After the reaction for about 60 minutes, 16 mmol of vinyl bromide was added in drops, and then reacted at 50° C. for 2 hours. After stirring the mixture at room temperature for one day, methanol was poured thereto. After removing the oxidized product using column chromatography, a high refractive-index polymer (A) of Formula A below was obtained. 3 g of the high refractive-index polymer (A) was dissolved in 3 g of toluene (a concentration of 50 wt %), and a photoinitiator (Igarcure 184, manufactured by Sigma-aldrich) was added thereto in an amount of 5 parts by weight relative to 100 parts by weight of the high refractive-index polymer (A) to prepare a high refractive-index composition (1).

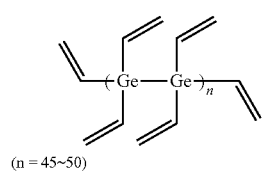

[Formula A]

(n = 45~50)

$^1$H NMR (500 MHz, DMSO-d6): δ=5.1, 5.5 (d, 2H, CH$_2$), 5.25~5.30 (d, H, CH)

Production of High Refractive-Index Film

The high refractive-index composition (1) was applied to a quartz substrate and then bar-coated. Next, the coated substrate was dried on a hot plate at 100° C. for 1 hour. Thereafter, a high refractive-index film was produced by irradiating the high refractive-index composition with ultraviolet rays having wavelengths of about 200 nm to 350 nm at an intensity of about 2,000 mJ/cm$^2$ using a UV curing machine (H-bulb) and photo-curing it.

EXAMPLE 2

Preparation of High Refractive-Index Composition 16 mmol of germanium tetrachloride and 128 mmol of magnesium (Mg) metal were added to 40 ml of THF (tetrahydrofuran), and then reacted under argon (Ar) for 90 minutes. Next, 16 mmol of vinyl bromide was slowly added in drops at 10° C. After the reaction for about 60 minutes, 16 mmol of bromobenzene (manufactured by sigma-aldrich) was added in drops, and then reacted at 50° C. for 2 hours. After stirring the mixture at room temperature for one day, methanol was poured thereto. After removing the oxidized product using column chromatography, a high refractive-index polymer (B) of Formula B below was obtained. 3 g of the high refractive-index polymer (B) was dissolved in 3 g of toluene (a concentration of 50 wt %), and a photoinitiator (Igarcure 184, manufactured by Sigma-aldrich) was added thereto in an amount of 5 parts by weight relative to 100 parts by weight of the high refractive-index polymer (B) to prepare a high refractive-index composition (2).

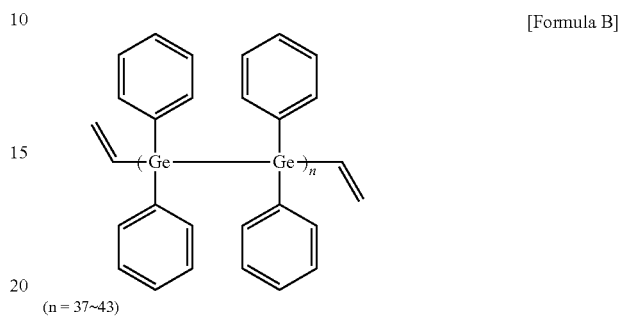

[Formula B]

(n = 37~43)

$^1$H NMR (500 MHz, DMSO-d6): δ=5.1, 5.5 (d, 2H, CH$_2$), 5.25~5.30 (d, H, CH), 7.30~7.40 (s, H, CH)

Production of High Refractive-Index Film

A high refractive-index film was produced in the same manner as in Example 1, except that the high refractive-index composition (1) was changed to the high refractive-index composition (2).

EXAMPLE 3

Preparation of High Refractive-Index Composition 16 mmol of germanium tetrachloride and 128 mmol of magnesium (Mg) metal were added to 40 ml of THF (tetrahydrofuran), and then reacted under argon (Ar) for 90 minutes. Next, 16 mmol of vinyl bromide was slowly added in drops at 10° C. After the reaction for about 60 minutes, 16 mmol of bromobutane (manufactured by sigma-aldrich) was added in drops, and then reacted at 50° C. for 2 hours. After stirring the mixture at room temperature for one day, methanol was poured thereto. After removing the oxidized product using column chromatography, a high refractive-index polymer (C) of Formula C below was obtained. 3 g of the high refractive-index polymer (C) was dissolved in 3 g of toluene (a concentration of 50 wt %), and a photoinitiator (Igarcure 184, manufactured by Sigma-aldrich) was added thereto in an amount of 5 parts by weight relative to 100 parts by weight of the high refractive-index polymer (C) to prepare a high refractive-index composition (3).

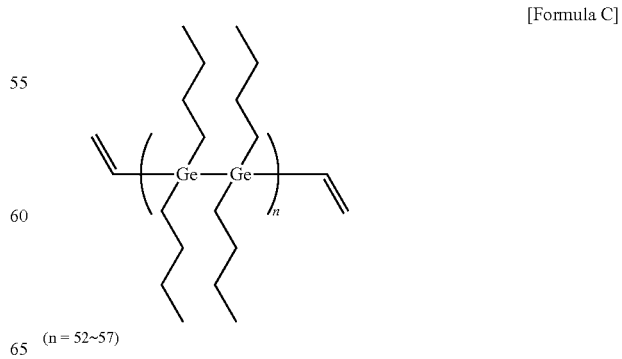

[Formula C]

(n = 52~57)

$^1$H NMR (500 MHz, DMSO-d6): δ=0.91 (t, 3H, CH$_3$), 1.27 (m, 2H, CH$_2$), 1.33 (m, 2H, CH$_2$), 1.34 (t, 2H, CH$_2$), 5.5 (d, 2H, CH$_2$), 5.25~5.30 (d, 1H, CH), 7.33 (s, 1H, CH)

Production of High Refractive-Index Film

A high refractive-index film was produced in the same manner as in Example 1, except that the high refractive-index composition (1) was changed to the high refractive-index composition (3).

EXAMPLE 4

Preparation of High Refractive-Index Composition 2.4 g of the high refractive-index polymer (A) prepared in Example 1 and 0.6 g of TMPTA (trimethylolpropane triacrylate, manufactured by sigma-aldrich) were dissolved in 3 g of toluene (40 wt % and 10 wt %, respectively), and a photoinitiator (Igarcure 184, manufactured by Sigma-aldrich) was added thereto in an amount of 5 parts by weight relative to 100 parts by weight of the high refractive-index polymer (A) to prepare a high refractive-index composition (4).

Production of High Refractive-Index Film

A high refractive-index film was produced in the same manner as in Example 1, except that the high refractive-index composition (1) was changed to the high refractive-index composition (4).

EXAMPLE 5

Preparation of High Refractive-Index Composition 2.4 g of the high refractive-index polymer (A) prepared in Example 1 and 0.6 g of divinylbenzene (manufactured by sigma-aldrich) were dissolved in 3 g of toluene (40 wt % and 10 wt %, respectively), and a photoinitiator (Igarcure 184, manufactured by Sigma-aldrich) was added thereto in an amount of 5 parts by weight relative to 100 parts by weight of the high refractive-index polymer (A) to prepare a high refractive-index composition (5).

Production of High Refractive-Index Film

A high refractive-index film was produced in the same manner as in Example 1, except that the high refractive-index composition (1) was changed to the high refractive-index composition (5).

EXAMPLE 6

Preparation of High Refractive-Index Composition 16 mmol of germanium tetrachloride (manufactured by sigma-aldrich) and 128 mmol of magnesium (Mg) metal (manufactured by sigma-aldrich) were added to 40 ml of THF (tetrahydrofuran), and then reacted under argon (Ar) for 90 minutes. Next, 16 mmol of epibromohydrin (manufactured by sigma-aldrich) was slowly added in drops at 10° C. After the reaction for about 60 minutes, 16 mmol of epibromohydrin was added in drops, and then reacted at 50° C. for 2 hours. After stirring the mixture at room temperature for one day, methanol was poured thereto. After removing the oxidized product using column chromatography, a high refractive-index polymer (D) of Formula D below was obtained. The obtained high refractive-index polymer (D) was identified by 1H-NMR. 3 g of high refractive-index polymer (D) was dissolved in 3 g of toluene (a concentration of 50 wt %), and an imidazole-based curing agent (C11ZA, manufactured by Shikoku Kasei Co., Ltd.) as a thermal initiator was added thereto in an amount of 5 parts by weight relative to 100 parts by weight of the high refractive-index polymer (D) to prepare a high refractive-index composition (6).

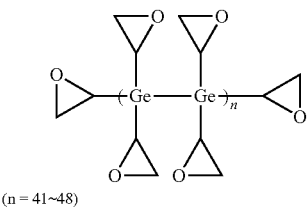

[Formula D]

(n = 41~48)

$^1$H NMR (500 MHz, DMSO-d$^6$): δ=0.40, (m, H, CH), 0.55,0.80 (m, 4H, CH$_2$)

Production of High Refractive-Index Film

The high refractive-index composition 6 was applied to a quartz substrate and then bar-coated. Next, a high refractive-index film was produced by applying heat to the coated high refractive-index composition at a temperature of about 180° C. for about 30 minutes and thermally curing it.

EXAMPLE 7

Preparation of High Refractive-Index Composition 16 mmol of germanium tetrachloride and 128 mmol of magnesium (Mg) metal were added to 40 ml of THF (tetrahydrofuran), and then reacted under argon (Ar) for 90 minutes. Next, 16 mmol of epibromohydrin was slowly added in drops at 10° C. After the reaction for about 60 minutes, 16 mmol of bromobenzene (manufactured by Sigma-aldrich) was added in drops, and then reacted at 50° C. for 2 hours. After stirring the mixture at room temperature for one day, methanol was poured thereto. After removing the oxidized product using column chromatography, a high refractive-index polymer (E) of Formula E below was obtained. The obtained high refractive-index polymer (E) was identified by $^1$H-NMR. 3 g of the high refractive-index polymer (E) was dissolved in 3 g of toluene (a concentration of 50 wt %), and an imidazole-based curing agent (C11ZA, manufactured by Shikoku Kasei Co., Ltd.) as a thermal initiator was added thereto in an amount of 5 parts by weight relative to 100 parts by weight of the high refractive-index polymer (E) to prepare a high refractive-index composition (7).

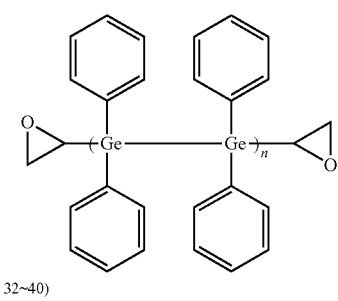

[Formula E]

(n = 32~40)

$^1$H NMR (500 MHz, DMSO-d$^6$): δ=0.40, (m, H, CH), 0.55,0.80 (m, 4H, CH$_2$), 7.30~7.40 (s, H, CH)

Production of High Refractive-Index Film

A high refractive-index film was produced in the same manner as in Example 6, except that the high refractive-index composition (6) was changed to the high refractive-index composition (7).

EXAMPLE 8

Preparation of High Refractive-Index Composition 16 mmol of germanium tetrachloride and 128 mmol of magnesium (Mg) metal were added to 40 ml of THF (tetrahydrofuran), and then reacted under argon (Ar) for 90 minutes. Next, 16 mmol of epibromohydrin was slowly added in drops at 10° C. After the reaction for about 60 minutes, 16 mmol of bromobutane (manufactured by sigma-aldrich) was added in drops, and then reacted at 50° C. for 2 hours. After stirring the mixture at room temperature for one day, methanol was poured thereto. After removing the oxidized product using column chromatography, a high refractive-index polymer (F) of Formula F below was obtained. The obtained high refractive-index polymer (F) was identified by $^1$H-NMR. 3 g of the high refractive-index polymer (F) was dissolved in 3 g of toluene (a concentration of 50 wt %), and an imidazole-based curing agent (C11ZA, manufactured by Shikoku Kasei Co., Ltd.) was added as a thermal initiator was added thereto in an amount of 5 parts by weight relative to 100 parts by weight of the high refractive-index polymer (F) to prepare a high refractive-index composition (8).

[Formula F]

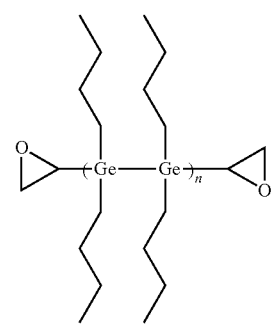

(n = 35~41)

$^1$H NMR (500 MHz, DMSO-d$^6$): δ=0.40, (m, H, CH), 0.55,0.80 (m, 4H, CH2), 0.91 (t, 3H, CH3), 1.27 (m, 2H, CH2), 1.33 (m, 2H, CH2), 1.34 (t, 2H, CH2), 7.33 (s, 1H, CH)

Production of High Refractive-Index Film

A high refractive-index film was produced in the same manner as in Example 6, except that the high refractive-index composition (6) was changed to the high refractive-index composition (8).

COMPARATIVE EXAMPLE 1

Preparation of High Refractive-Index Composition 3 g of polycarbonate (manufactured by Sigma-aldrich) was dissolved in 3 g of toluene (50 wt %) and dissolved in dioxane to prepare a high refractive-index composition (9).

Production of High Refractive-Index Film

A high refractive-index film was produced in the same manner as in Example 1, except that the high refractive-index composition (1) was changed to the high refractive-index composition (9).

COMPARATIVE EXAMPLE 2

Preparation of High Refractive-Index Composition 3.75 g (0.01 mol) of bis(dimethylphenyl) digermoxane (manufactured by cimit) was added to 70 ml of THF (tetrahydrofuran) and the flask was substituted with nitrogen. Then, the reaction product was extracted with toluene and dried over anhydrous magnesium sulfate. Next, after removing toluene, the product was dried in vacuum to obtain dimethyl poly(Ge—O—Ge). 3 g of dimethyl poly(Ge—O—Ge) was dissolved in 3 g of toluene (50 wt %) to prepare a high refractive-index composition (10).

Production of High Refractive-Index Film

The high refractive-index composition (10) was applied to a quartz substrate and then bar-coated. Next, the coated substrate was dried on a hot plate at 100° C. for 1 hour to produce a high refractive-index film.

MEASUREMENT EXAMPLE 1

Thickness and Refractive Index Measurement

For the films produced in Examples 1 to 8 and Comparative Examples 1 to 2, the thickness and refractive index were measured and the results were described in Table 1 below. Specifically, the thickness was measured by an ellipsometry measurement method using an ellipsometer (Elli-SE, manufactured by Ellipso Technology Co., Ltd.), and the refractive index for a wavelength of 632nm as the refractive index was measured using a refractive index measuring device (SPA-3DR, manufactured by SAIRON Tech.).

TABLE 1

|  | Thickness (μm) | Refractive index |
| --- | --- | --- |
| Example 1 | 1.15 | 2.4 |
| Example 2 | 1.23 | 2.2 |
| Example 3 | 1.18 | 2.3 |
| Example 4 | 1.17 | 2.0 |
| Example 5 | 1.12 | 1.8 |
| Example 6 | 1.18 | 2.3 |
| Example 7 | 1.20 | 2.1 |
| Example 8 | 1.17 | 2.0 |
| Comparative Example 1 | 1.10 | 1.4 |
| Comparative Example 2 | 1.21 | 1.7 |

The invention claimed is:

1. A high refractive-index composition comprising a polymer containing a polymerized unit containing germanium (Ge) elements as a main chain and at least two or more photoreactive groups or thermally reactive groups as side chains, wherein the high refractive-index composition further comprises a photopolymerization initiator or a thermal polymerization initiator.

2. The high refractive-index composition according to claim 1, wherein the main chain of the polymer comprises the germanium (Ge) elements in the form of a Ge—Ge bond.

3. The high refractive-index composition according to claim 1, wherein the polymer is a compound represented by Formula 1 below:

[Formula 1]

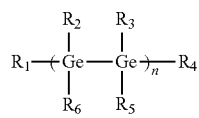

wherein, $R_1$ to $R_6$ are each independently a hydrogen atom, an alkyl group, an aryl group, a photoreactive group or a thermally reactive group, at least two of $R_1$ to $R_6$ are photoreactive groups or thermally reactive groups, and n is an integer of 5 to 1000.

4. The high refractive-index composition according to claim 1, wherein the photoreactive group comprises a vinyl group, a (meth)acryl group, a (meth)acryloyloxy group, a (meth)acrylamide group, a vinyloxy group or a maleimide group.

5. The high refractive-index composition according to claim 1, wherein the thermally reactive group comprises an epoxy group, an oxetane group, an alkenyl group, a hydrogen atom bonded to a silicon atom, an isocyanate group, a hydroxy group, a phthalonitrile group or a carboxyl group.

6. The high refractive-index composition according to claim 1, wherein the composition further comprises a photocurable monomer or a thermosetting monomer.

7. The high refractive-index composition according to claim 6, wherein the photocurable monomer is a multifunctional compound having at least two or more photocurable groups, and the thermosetting monomer is a multifunctional compound having at least two or more thermosetting groups.

8. The high refractive-index composition according to claim 6, wherein the photocurable monomer or the thermosetting monomer is included in an amount of 10 to 50 parts by weight relative to 100 parts by weight of the polymer.

9. A high refractive index film comprising a cured product of a high refractive-index composition, wherein the high refractive-index composition includes a polymer containing a polymerized unit containing germanium (Ge) elements as a main chain and at least two or more photoreactive groups or thermally reactive groups as side chains, and wherein the high refractive-index composition further comprises a photopolymerization initiator or a thermal polymerization initiator.

10. The high refractive-index film according to claim 9, wherein the at least two or more photoreactive groups of the polymer are present in a bonded state by reacting with each other, or the at least two or more thermally reactive groups are present in a bonded state by reacting with each other.

11. The high refractive-index film according to claim 9, wherein the high refractive-index film has a refractive index of 1.8 or more for a wavelength of 632 nm.

12. A method for producing a high refractive-index film comprising steps of coating a high refractive-index composition on a substrate, and irradiating the coated composition with light or applying heat thereto,
wherein the high refractive-index composition includes a polymer containing a polymerized unit containing germanium (Ge) elements as a main chain and at least two or more photoreactive groups or thermally reactive groups as side chains, and wherein the high refractive-index composition further comprises a photopolymerization initiator or a thermal polymerization initiator.

13. The method for producing a high refractive-index film according to claim 12, wherein the light irradiation is performed by irradiating with ultraviolet rays at an intensity of 500 mJ/cm$^2$ to 5000 mJ/cm$^2$.

14. The method for producing a high refractive-index film according to claim 12, wherein the heat application is performed in a temperature range of 30° C. to 260° C. for 10 minutes to 24 hours.

\* \* \* \* \*